(12) United States Patent
Dehmer

(10) Patent No.: US 6,572,155 B2
(45) Date of Patent: Jun. 3, 2003

(54) TUBE FITTING

(75) Inventor: Bernhard Dehmer, Rastatt (DE)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 10/057,407

(22) Filed: Jan. 25, 2002

(65) Prior Publication Data

US 2002/0109354 A1 Aug. 15, 2002

(30) Foreign Application Priority Data

Jan. 31, 2001 (DE) .......................... 101 04 508

(51) Int. Cl.⁷ ................................. F16L 25/00
(52) U.S. Cl. ................. 285/334.5; 285/348; 285/354
(58) Field of Search ..................... 285/334.5, 348, 285/354, 280, 281

(56) References Cited

U.S. PATENT DOCUMENTS

| | | | | |
|---|---|---|---|---|
| 2,354,538 A | * | 7/1944 | Parker | 285/334 |
| 2,427,260 A | * | 9/1947 | Cowles | 285/334.5 |
| 2,473,120 A | * | 6/1949 | Wolfram | 285/334.4 |
| 2,999,701 A | * | 9/1961 | Blair et al. | 285/340 |
| 3,058,762 A | * | 10/1962 | Howe | 285/340 |
| 3,185,501 A | * | 5/1965 | Bowan et al. | 285/52 |
| 4,537,425 A | * | 8/1985 | Press et al. | 285/340 |
| 4,538,842 A | * | 9/1985 | Kowal et al. | 285/234 |
| 5,310,227 A | * | 5/1994 | Grinsteiner | 285/234 |
| 5,496,076 A | * | 3/1996 | Lin | 285/110 |

* cited by examiner

Primary Examiner—Lynne H. Browne
Assistant Examiner—James M. Hewitt

(57) ABSTRACT

A tube fitting provides a sealed flow connection between an open-ended duct that extends along the longitudinal axis of a tube and an open-ended duct of a base element, for liquid separation technology. The tube fitting has a ring-shaped thrust piece with a receptacle for the tube and a ring-shaped, spring-elastic compensating element with receptacle for the tube. The tube fitting further comprises a fastening element that can be fastened tightly to the base element. When sealed, the base element, the thrust piece, the compensating element and the tube can be braced by means of the fastening element under elastic deformation of the compensating element. A spring serves as a compensating element, wherein the spring and the connection parts arranged within the spring excursion range are coordinated to each other such that a leaky connection caused by elastic deformaton or material settling of parts braced together is excluded.

9 Claims, 1 Drawing Sheet

TUBE FITTING

BACKGROUND OF THE INVENTION

1. Field of the Invention

The invention pertains to a tube fitting for providing a sealed flow connection between an open-ended duct that extends along the longitudinal axis of the tube and an open-ended duct of a base element, for liquid separation technology, in particular for analytical or preparative HPLC, that can be preferably unattached and that comprises a ring-shaped thrust piece which provides a receptacle for the tube, a ring-shaped, elastic compensating element which provides a receptacle for the tube, and a fastening element which preferably is manually operable and which can be tightly fastened to the base element, wherein the tube preferably has a ring flange on its end connected to the base element that protrudes from the longitudinal axis of the tube, and wherein, when sealed, the base element, the thrust piece, the compensating element and the tube can be braced by means of the fastening element under elastic deformation of the compensating element.

2. Discussion of the Background Art

There is a plethora of tube fittings used in a wide variety of applications for connecting tubes with tube connector elements providing flow ducts, for example, fitting connectors, complex hydraulic units, seals or other tubes, such that a sealed flow connection between the tube and the flow duct of the tube connector element results.

Tube fittings in the area of liquid separation technology, used in particular in the area of analytical or preparative HPLC, must fulfill very specific requirements with respect to the materials used on the one hand and the constructive design of the tube fittings on the other hand. Such tube fittings must withstand increases in pressure up to 60 bar and/or temperature increases, and must also enable a permanent sealing of the connectable flow ducts under these conditions as well.

Particularly when implemented in preparative systems, dead zones such as pocket holes or poorly flushed areas must be avoided by all means in order to prevent entrainment of sediment and subsequent band widening.

Tube fittings provided on measuring detectors downstream of separation columns, in particular measuring bulbs, must satisfy the tight spacing conditions caused by the closely adjacent inputs and outputs of the measuring bulbs. This means that the tube fittings must have a low center distance and must be simply and easily manually detachable and reattachable as well. Because the bulbs consist primarily of quartz glass, high-gloss sealing surfaces can be used that enable a secure seal even with relatively low sealing force.

In tube fittings for valves, in particular for fraction collectors such as two/three-way-valves, the base bodies of the valves are made mostly of stainless steel. Due to the usually poor accessibility of sealing surfaces found within the area of pocket-hole type borings, these usually have a relatively rough surface, such that increased sealing forces are required for an adequately secure seal. It is important in this application as well to be able to place the tube fittings within a low center distance in order to avoid undesirable band widening caused by comparatively large valve volumes. Furthermore, these tube fittings must be simply and easily attachable and detachable.

In the area of liquid separation technology there are essentially two known types of purely mechanical, reattachable tube fittings.

In a first type of tube fittings, mostly polymer tubes with smooth edges are used that have an interface normally along the longitudinal axis of the tube. These tube fittings, also known as "ferrules", may either be pre-assembled or not pre-assembled. In pre-assembled tube fittings, a male-threaded clamping screw providing a through-hole, a clamp ring made from a relatively hard material, and finally a polymer seal ring is fitted over the edge which has an inner diameter corresponding to the outer diameter of the tube or which is slightly smaller than the outer diameter of the tube. The clamp ring and the seal ring are coordinated to each other with wedge-shaped peripheral surfaces perpendicular to the grain such that when the clamp ring is fitted over the seal ring, the latter is elastically deformed radially outward such that a clamping force is induced radially between the seal ring and the outer surface of the tube, which forms the seal to the tube. In addition, another axial force component is induced by the clamp ring which, working together with a ring flange of the seal ring, provides a seal between its axial fore-part and the base body or tube connection element respectively. The actual seal to the tube on the one hand and to the base body on the other hand is formed by tightening the clamp screw, whereby its clamp surface, which normally runs along the longitudinal axis of the tube, is pushed in the direction of the parallel fore-part of the clamp ring.

The disadvantage of this simple and cost-efficient tube fitting is that the polymer seal ring creeps over time subject to the active tightening forces and therefore plastically deforms, resulting in respectively diminishing sealing forces and finally to an unsealed connection.

In a second type of tube fittings, used in the area of liquid separation technology, the polymer tubes, which are likewise favorable, have a ring flange on their ends in the shape of a raised-edge, the side parts of which protrude radially outward over the outer diameter of the tube. Either before the creation of the flange or from the opposing end of the tube, a planed perforated plate, a polymer O-ring seal and a male-threaded clamp screw providing a through-hole is fitted over the tube such that the perforated plate lies directly opposite the ring flange of the tube, while the O-ring and finally the clamp screw is arranged in the direction of the end of the tube opposite the ring flange. A clamp screw, which normally has its surface arranged to the longitudinal axis of the tube and the O-ring, is screwed and tightened in a female threading of an opening of the base body or tube connection piece respectively. The front side of the clamp surface of the clamp screw thereby presses against the elastically deformable seal ring. This is supported on the perforated plate, which in turn supports itself off the opposing ring flange of the tube. This can result in undefined rotating and a tumbling motion of the perforated plate when the clamp screw is tightened, resulting in undefined seal conditions at the junction to the ring flange of the tube. Moreover, the ring flange or parts thereof may move off-center or shift relative to the opposing sealing surfaces of the base body, resulting in the formation of undesirable dead spaces. Finally, in this type of tube fitting it is unavoidable that the polymer O-ring creeps over time under the tightening momentum, i.e. plastically deforms over time, resulting in leaks.

SUMMARY OF THE INVENTION

Accordingly, an object of the invention is to provide a tube connection that is easy to manage and that can be activated with a low amount of exertion, with which a secure flow connection between the tube and the duct piece of a base element connected with the tube is guaranteed over long periods of time.

This object is carried out according to the invention by means of the features of claim 1, in particular in that a spring which serves as a compensating element is provided with a pre-determined spring excursion, wherein the spring and connection parts within the spring excursion range are coordinated to each other such that a leak in the connection caused by plastic deformation or material settling of parts braced together is excluded with certainty.

The spring is best provided with at least one perforated plate which is arranged preferably either to a middle section or as a disc spring. These seemingly easy steps have surprisingly turned out that contrary to known state of the art tube connections, a sealed connection between flow ducts can be achieved over long periods of time as well.

It is sensible furthermore if the thrust piece is form-stable under the necessary sealing forces and consists of a harder material than that of the tube. Secure and reproducible sealing conditions can be achieved in this way, wherein the active sealing forces can be led efficiently by the spring, which preferably is arranged as a perforated plate, over the thrust piece either onto another clamping element, for example a clamp ring corresponding to a tube fitting arranged as a ferrule or onto a ring flange of the tube arranged on the end of the tube.

It is particularly favorable if the thrust piece is arranged symmetrically to a middle section such that the force application point can be arranged opposite and parallel to the longitudinal axis of the tube. By doing so, the thrust piece can be prevented from tipping over and optimal centering conditions can be obtained.

The thrust piece is best arranged rotationally symmetrical and with side parts that taper radially outward. This allows for a tube connection that is particularly easy and cost-effective. The aforementioned measures allow the force application points on the thrust piece to be particularly close to the outer circumference of the tube, i.e. within the smallest possible distance to the longitudinal axis of the tube. By doing so the frictional forces and tightening momentum can be minimized and favorable sealing conditions are attainable such that co-rotation of the thrust piece can be prevented.

Such advantage is attained particularly if the thrust piece is arranged between the perforated plate and the base element and the perforated plate is arranged between the fastening element and the thrust piece.

It is particularly favorable if the thrust piece and an opposing ring flange of the tube protruding from the longitudinal axis of the tube are coordinated to each other such that an extending ring gap is formed between the thrust piece and the ring flange when the thrust piece is put on the tube and in the non-braced state, in which the thrust piece fits closely on the ring flange. In this way, when the connection elements are braced in the direction of the axis with relatively low tightening momentum, increased surface pressure can be exerted on the flange base, and the tube connections, which preferably are provided with fastening elements in the form of clamp screws, can be placed at the lowest possible distance from each other.

If the ring flange, which is connected to the tube forming one piece, consists of a polymer, preferably of a fluoropolymer, in particular PTFE or FEP, the ring flange may plastically deform under the active sealing forces. This means that the active surface can increase to the thrust piece until the respective force supply is compensated. It is therefore particularly sensible if an angle of 5 to 25 degrees, in particular an angle of approximately 10 degrees, is formed between the side parts of the ring flange and opposed side parts of the unbraced thrust piece adjacent thereto. This allows for steady surface pressure between the thrust piece and the ring flange of the tube to be achieved, both with low sealing forces or tightening momentum as well as with large sealing forces or tightening momentum respectively. This signifies a comparatively large tolerance for permissible axis bracing or permissible tightening momentum respectively. When a perforated plate is used as a spring, which preferably is arranged between the thrust piece and the active surfaces of the fastening element, it is elastically deformed over a set spring excursion and consequently can compensate a plastic deformation of the tube or ring flange of the tube respectively over its operational lifetime within the limits of the predetermined spring excursion.

According to another particularly favorable embodiment of the invention, preferable force application conditions on the one hand and favorable sealing conditions on the other hand can be achieved if the thrust piece formed symmetrically to a middle section is arranged with rotationally symmetrical side parts that taper radially outward and the perforated plate is also formed symmetrically to a middle section, preferably with parallel ring surfaces leading away from each other, and if the fastening element is formed with the ring surfaces arranged inclined toward the direction of the ring flange of the tube. When the fastening element is braced relative to the base element, the perforated plate is elastically deformed between the active surfaces of the fastening element and the active surfaces of thrust piece can thereby compensate axial defects between the braced elements, which requires comparatively low bracing force. Moreover, centering on the tube of the thrust piece or downstream fastening elements respectively can be achieved through this configuration and contingent upon elastic deformation of the perforated plate such that favorable sealing conditions are attained and unfavorable dead spaces are prevented.

The invention also concerns a use of a screw connection, which has one or several of the aforementioned characteristics individually or in combination with each other for the sealed connection of flow ducts in liquid separation technology, in particular in analytical or preparative HPLC.

In this type of use it is advisable for the tube to have an outside diameter of less than or equal to 6.5 mm, in particular less than or equal to 2 mm and an inside diameter of less than or equal to 5.5 mm, in particular 0.25 to 1.0 mm.

It is furthermore advisable if the tube has a through-flow channel that enables flow rates up to 6,000 ml/minutes, in particular 1 ml per minute to 100 ml per minute.

The aforementioned characteristics contribute both individually as well as in combination with each other to a tube connection that is both easily manageable and operable with low energy expenditure, and that guarantees a sealed flow connection between the tube and a connected flow duct part over long periods of time.

BRIEF DESCRIPTION OF THE DRAWINGS

Further characteristics, criteria and benefits of the invention can be found in the following description section, in which an example of a preferred embodiment of the invention is outlined by means of a single FIGURE.

DETAILED DESCRIPTION OF THE INVENTION

Figure 1:
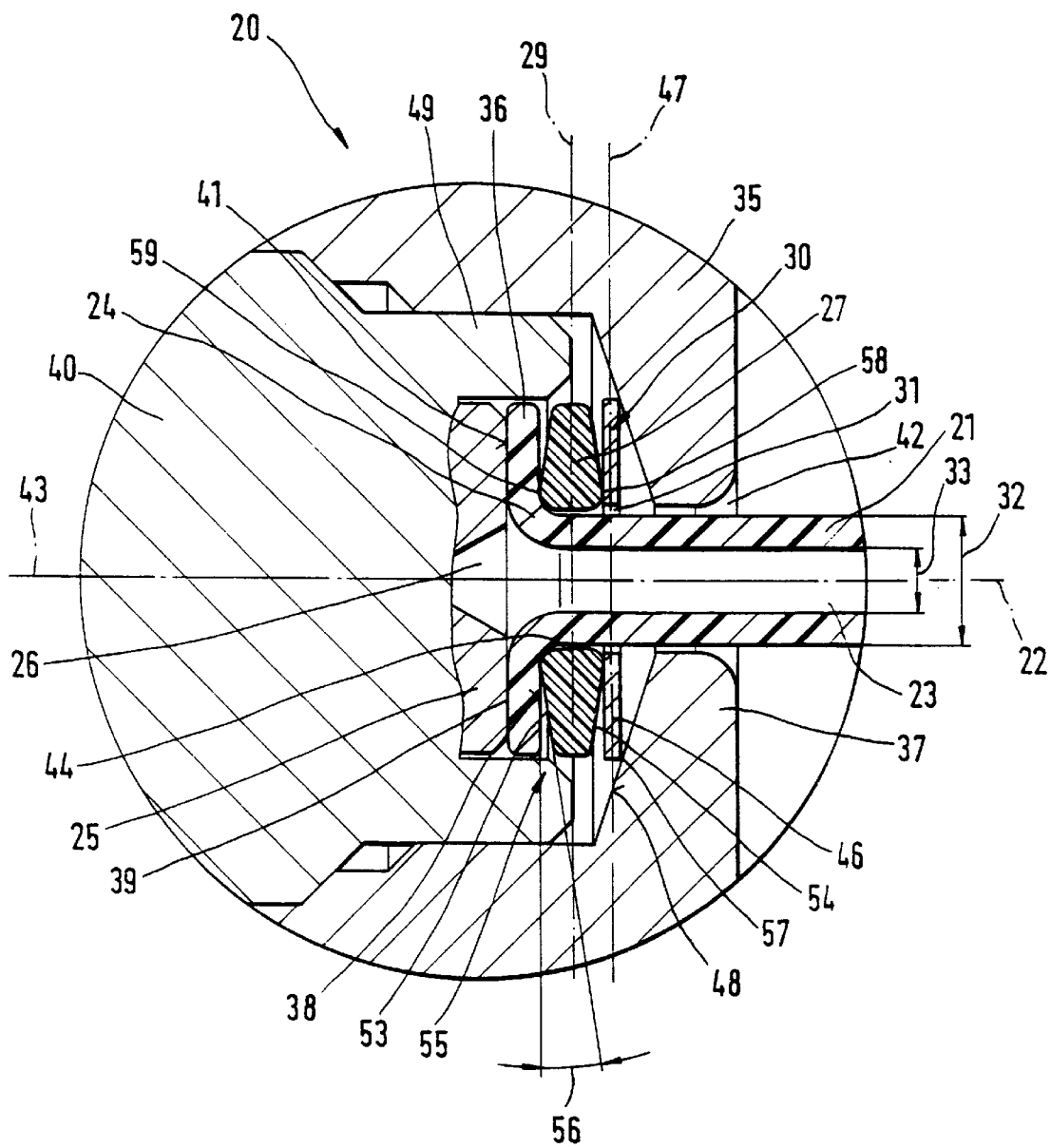
FIG. 1 shows a cross-sectional view through a tube fitting according to the invention.

The tube fitting (20) shown in FIG. 1 provides a sealed flow connection between the tube (21) and the base element (25). The base element (25) can be a seal, a fitting connection or a complex hydraulic unit. The tube fitting (20) also comprises the thrust piece (27) and the compensating element (30), which is present here in the form of a perforated plate (46) as well as fastening element (35). The fastening element (35) shown here is arranged preferably with a swivel nut providing an outer edge with internal threading, which is in active connection with corresponding exterior threading of a base body (40). The base element (25), which supports itself off the base body (40), the tube (21), the thrust piece (27) and the perforated plate (46) can be braced using the fastening element (35) forming a sealed flow connection between the tube (21) and the base element (25). For this, the fastening element (35) provides flange-like designed shanks (37) that extend radially outward from the bore (42), which is arranged as a receptacle for the tube (21), and that are connected with the female threading of the fastening element (35) building one piece.

The rotationally symmetrically designed tube (21) is received in the bore (42) of the fastening element (35) and has an outer diameter (32) of preferably 1.6 mm and an inner diameter (33) assigned to the duct (23) of approximately 0.25 to 1.0 mm. The duct (23) is arranged here rotationally symmetrical to the longitudinal axis (22) of the tube (21). The tube (21) provides the ring flange (36) at its end (24). This is arranged with side parts that protrude radially outward over the outer diameter (32) of the tube (21), which are designed here with the opposing ring surfaces (38) and (39) arranged parallel to each other. The ring surfaces (38) and (39) are normally arranged to the longitudinal axis (22) of the tube. The ring flange (36) is connected as one piece with the tube (21), but can be connected as a separate piece with the tube (21), however. The tube (21) and the ring flange (36) consist preferably of PTFE or FEP. These types of fluoropolymers are conducive to particularly favorable sealing conditions and are particularly suitable for use in liquid separation technology with respect to their usability in increased pressures and/or increased temperatures and/or aggressive fluids.

The shanks (37) of the fastening element (35) are provided with ring surfaces (48) that slope in the direction of the ring flange (36) of the tube (21). The perforated plate (46) is arranged opposite to the ring surfaces (48). Said perforated plate is arranged here as a flat disc rotationally symmetrically and also symmetrically to a middle section (47) with opposing parallel surfaces that extend normally along the longitudinal axis (22) of the tube (21). The perforated plate is provided with the central receptacle (31), through which the tube (21) is fed.

The thrust piece (27) is arranged between the perforated plate (46) and the ring flange (36) of the tube (21). It is likewise arranged rotationally symmetrical as well as symmetrical to a middle section (29), which is normally designed to the longitudinal axis of the tube (22). The thrust piece (27) preferably consists of a material that is form-stable even at increased temperatures in terms of active pressure forces, in this case PEEK. The thrust piece (27) provides side parts that taper radially outward designed with ring surfaces (53) and (54). These ring surfaces (53) and (54) are each arranged to the middle section (29) sloping at an angle (56) of approximately 10 degrees. The thrust piece (27) is specifically rounded off at the junction of its cylindrical bore (44) which serves to receive the tube (21), also called the receptacle, to the ring surface (53). Tension surges in the area of the base of the ring flange (36) are thereby avoided.

The tube fitting (20) of FIG. 1 is shown in a position in which the fastening element (35) perforated plate (46), thrust piece (27), ring flange (36) of the tube (21) and base element (25) contact each other evenly such that no significant forces between the individual connecting elements arise. Moreover, the force flow emanating from the fastening element (35) moves to the perforated plate (46) over its ring surfaces (48), which are sloped toward the ring flange (36) and over the force application points (57) on the outer diameter of the perforated plate (46), which ideally form a linear force application ring. Emanating from the perforated plate (46), the force flow passes over the force application points (58) of the ring-shaped thrust piece (27), which are arranged close to the outer surface of the tube (21), which is likewise in the form of a circuit, into this and over opposing as well as parallel force application points (59) accordingly configured to the tube longitudinal axis (22) onto the ring surface (38) of the ring flange (36). The pressure forces exertable over the fastening element (35) are then transferred from there over the ring surface (39) of the ring flange (36) onto the opposing ring surface (41) of the base element (25).

The base element (25) is only shown schematically here and is shown with the central bore duct (26) that has a longitudinal axis (43) designed coaxially to the longitudinal axis (22) of the tube (21). The aperture of the duct (26) that lies opposite the end (24) of the tube (21) is arranged with conically inward tapering side parts in the example embodiment. The duct aperture has an inner diameter at the junction of the ring surface (41) to the ring flange (36) which it lies opposite to, that is larger here than the inside diameter (33) of the tube (21) and that is smaller than the outside diameter (32) of the tube (21). The base element (25) is supported either force and/or form locked to the base body (40), which is not gone into more detail. It goes without saying that the base element (25) can be connected in one piece or many pieces with the base body (40). The base body (40) here has a sleeve-like configured flange piece (49), the shank of which extends parallel to the longitudinal axis (22) of the tube (21). The flange piece (49) has a central cylindrical bore that has an inner diameter slightly larger than the outside diameter of the base element (25), the outside diameter of the ring flange (36), as well as the outside diameter of the thrust piece (27). In this way, the latter three combining elements can be accepted in the cylindrical cavity of the flange piece (49).

Emanating from the base element (25) the force flow moves over the base body (40), which is provided here with male threading in the area of the outer diameter of the flange piece (49). The female threading of the fastening element (35) is screwed onto this male threading such that the force flow ceases within the area of these threaded parts.

To create a permanently sealed connection between the individual connection elements, the fastening element (35) is rotated relative to the base element (25) or relative to the base body (40) respectively, such that the shanks (37) of the fastening element (35) approach the ring surface (41) of the base element (25) with their ring surfaces (48). The perforated plate (46), the fastening element (35), the thrust piece (27), the ring flange (36) of the tube (21) and the base element (25) are braced at the same time. Because the material of the base body (27) is designed form-stable against the active pressure forces and because a relatively more supple material, here in the form of a fluoropolymer, is chosen for the tube (21) or ring flange (36) respectively, the thrust piece (27) is pressed over the perforated plate (46) in the direction of the ring flange (36), which deforms plastically as well as elastically in the area of the opposing force application points. The ring gap (55) between the ring surface (53) of the thrust piece (27) opposite the ring flange (36) and the ring surface (38) of the ring flange (36) becomes smaller when a circular sealing surface is formed, wherein the ring surface (53) of the thrust piece (27) may completely border the ring flange (36). In this state, the sealing surface corresponds to the total amount of the ring surface (53). The ring flange (36) of the tube (21) deforms under the pressure forces transduced over the thrust piece (27) onto it such that the opening diameter of the duct (23) opposite the duct (26) of the base element (25) becomes smaller, until the aperture diameter corresponds to the outer diameter of the duct aperture (26). As such, no dead spaces arise between the ring flange (36) and the duct (26) of the base element (25) in the sealed state that could lead to unwanted band widening. In the sealed state, the perforated plate (46) is elastically deformed relative to the fastening element (35) on the one hand, and the thrust piece (37) on the other hand, and the active spring forces are able to compensate creeping of the polymer ring flange (36) over time within the framework of the spring excursion enabled between the ring surface (48) of the shank (37) of the fastening element (35) and the ring surface (54) of the thrust piece (27).

In the favorable embodiment variants of FIG. 1, both the thrust piece (27) as well as the compensating element (30) designed as the perforated plate (46) are arranged symmetrically to their respective middle surfaces (29) and (47) respectively. In addition to the benefits described above, inadvertent false assembly of these parts can be actively excluded thereby. It is understood, however, that the thrust piece can only be tapered on the surface pointing towards the ring flange (36) across from the longitudinal axis (22) of the tube (21), while the surface opposite the compensating element (30) can be arranged normally to the longitudinal axis (22) of the tube (21) or otherwise arranged and that a disc spring can also be used as a compensating element instead of the perforated plate (46) shown in FIG. 1. This can preferably be joined to the thrust piece in the area of its inside diameter and can then be propped within the area of its outside diameter to the opposing active surfaces of the fastening element. Moreover, the active surfaces of the fastening element as shown in FIG. 1 can be arranged with sloping ring surfaces (48) or, for example, also with normal active surfaces extending along the tube axis (22). Finally, it is understood that instead of a tube (21) with a ring flange (36), a tube can be combined with ring surfaces cut normally to the longitudinal axis of the tube, along with known state of the art combining elements, in particular with clamp rings known from ferrules and polymer seal rings.

What is claimed is:

1. A tube fitting for providing a sealed flow connection between an open-ended duct of a tube having a ring flange at one end and an open-ended duct of a base element, comprising:

a ring-shaped thrust piece that provides a receptacle for the tube;

an elastic compensating element that provides a receptacle for the tube; and a fastening element that can be tightly fastened to a base body supporting the base element;

wherein the ring flange abuts the base element;

wherein, when sealed, the base element, the thrust piece, the compensating element and the tube are braced by means of the fastening element, whereby the compensating element is elastically deformed;

wherein the compensating element comprises a spring having at least one perforated plate arranged rotationally symmetrical and having a spring deflection;

wherein the spring and the braced parts being configured within a range of the spring deflection and are coordinated to each other such that a leaky connection caused by plastic deformation or material settling of parts braced together is excluded;

wherein the thrust piece is arranged between the perforated plate and the base element;

wherein the thrust piece is rotationally symmetrical and has side parts that taper radially outward; and wherein the thrust piece and the ring flange of the tube that protrudes radially outward and normally to the longitudinal axis of the tube are coordinated such that an extending gap is formed between the thrust piece and the ring flange when the thrust piece is put on the tube and fits closely on the ring flange when the fastening element is not braced relative to the base element.

2. The tube fitting according to claim 1, wherein said perforated plate is configured as a disc spring.

3. The tube fitting according to claim 1, wherein said thrust piece essentially maintains its shape under sealing forces that arise when said fastening element is braced relative to said base element; and wherein said thrust piece is comprised of material that is harder than the material of said tube.

4. The tube fitting according to claim 1, wherein said ring flange is made of a fluoropolymer.

5. The tube fitting according to claim 4, wherein said fluoropolymer is selected from the group consisting of a polytetrafluoroethylene (PTFE) and a flourinated ethylene propylene (FEP).

6. A tube fitting according to claims 4 or 5, wherein an angle of between about 5 to 25 degrees is formed between side parts of said ring flanges and opposed side parts of said thrust piece adjacent thereto.

7. The tube fitting according to claim 6, wherein said angle is about 10 degrees.

8. A tube fitting for providing a sealed flow connection between an open-ended duct of a tube having a ring flange at one end and an open-ended duct of a base element, comprising:

a ring-shaped thrust piece that provides a receptacle for the tube;

an elastic compensating element that provides a receptacle for the tube; and a fastening element that can be tightly fastened to a base body supporting the base element;

wherein the ring flange abuts the base element;

wherein, when sealed, the base element, the thrust piece, the compensating element, and the tube are braced with the fastening element, whereby the compensating element is elastically deformed;

wherein the compensating element comprise a spring and a spring deflection, the spring having at least one perforated plate arranged rotationally symmetrical;

wherein the spring and braced parts being configured within a range of the spring deflection and are coordinated to each other such that a leaky connection caused by plastic deformation or material settling of parts braced together is excluded;

wherein the thrust piece is arranged between the perforated plate and the base element;

wherein the thrust piece is arranged symmetrically to its middle section that is designed normally to the longitudinal axis of the tube;

wherein the thrust piece is rotationally symmetrical and has side parts that taper radially outward; and wherein the fastening element is formed with ring surfaces arranged inclined toward the direction of the ring flange of the tube so that, when the fastening element is braced relative to the base element, the perforated plate is elastically deformed between the inclined ring surfaces of the fastening element and active surfaces of the thrust piece.

9. The tube fitting according to claim 8, wherein said perforated plate is arranged symmetrical to its middle section that extends normal to the longitudinal axis of said tube.

* * * * *